US010698997B2

(12) United States Patent
Li

(10) Patent No.: US 10,698,997 B2
(45) Date of Patent: Jun. 30, 2020

(54) LOGIN INFORMATION DATA PROCESSING

(71) Applicant: Alibaba Group Holding Limited, George Town (KY)

(72) Inventor: Hao Li, Chengdu (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 181 days.

(21) Appl. No.: 16/034,196

(22) Filed: Jul. 12, 2018

(65) Prior Publication Data

US 2019/0018947 A1    Jan. 17, 2019

(30) Foreign Application Priority Data

Jul. 14, 2017    (CN) .......................... 2017 1 0574655

(51) Int. Cl.
| | |
|---|---|
| G06F 21/00 | (2013.01) |
| G06F 21/33 | (2013.01) |
| H04L 9/32 | (2006.01) |
| G06F 21/31 | (2013.01) |
| H04L 29/06 | (2006.01) |

(Continued)

(52) U.S. Cl.
CPC .............. *G06F 21/33* (2013.01); *G06F 21/31* (2013.01); *H04L 9/0637* (2013.01); *H04L 9/0643* (2013.01); *H04L 9/0825* (2013.01); *H04L 9/3236* (2013.01); *H04L 63/083* (2013.01); *H04L 2209/38* (2013.01)

(58) Field of Classification Search
CPC ................................ G06F 21/33; G06F 21/31
USPC ........................................................... 726/8
See application file for complete search history.

(56) References Cited

U.S. PATENT DOCUMENTS

| | | | |
|---|---|---|---|
| 5,715,397 A | 2/1998 | Ogawa et al. | |
| 7,249,369 B2 | 7/2007 | Knouse et al. | |

(Continued)

FOREIGN PATENT DOCUMENTS

| | | |
|---|---|---|
| CN | 102546770 | 7/2012 |
| CN | 106453407 | 2/2017 |

(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.

(Continued)

*Primary Examiner* — Anthony D Brown
(74) *Attorney, Agent, or Firm* — Fish & Richardson P.C.

(57) ABSTRACT

Techniques related to login information data processing are described. In one example method, a smart contract is created based on a predetermined smart contract template. The smart contract includes login information corresponding to a user. The created smart contract is stored at a storage address in a blockchain network based on the identifier. A login information query request is received from the user, and the login information query request includes the identifier. At least one smart contract is retrieved from the blockchain network based on the identifier, and the smart contract corresponding to the user is determined from the at least one retrieved smart contract. The smart contract corresponds to the user is executed to obtain at least one login information, and sending the obtained login information to the user.

17 Claims, 6 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 2002/0032640 | A1 | 3/2002 | Lafore et al. |
| 2004/0158746 | A1 | 8/2004 | Hu et al. |
| 2005/0204041 | A1 | 9/2005 | Blinn et al. |
| 2009/0027724 | A1 | 1/2009 | Nagase et al. |
| 2016/0330027 | A1 | 11/2016 | Ebrahimi |
| 2017/0140408 | A1 | 5/2017 | Wuehler |
| 2017/0178127 | A1* | 6/2017 | Kravitz ............ G06Q 20/38215 |
| 2018/0117447 | A1* | 5/2018 | Tran ........................ B33Y 10/00 |

FOREIGN PATENT DOCUMENTS

| | | |
|---|---|---|
| CN | 106453415 | 2/2017 |
| CN | 106533696 | 3/2017 |
| CN | 106559211 | 4/2017 |
| CN | 106600405 | 4/2017 |
| CN | 106778109 | 5/2017 |
| TW | M543413 | 6/2017 |

OTHER PUBLICATIONS

Nakamoto, "Bitcoin: A Peer-to-Peer Electronic Cash System," www.bitcoin.org, 2005, 9 pages.

PCT International Preliminary Report on Patentability in International Application No. PCT/US2018/042064, dated Jun. 24, 2019, 6 pages.

Wikipedia, "Smart contract," Jul. 2017, [retrieved on Oct. 11, 2018], retrieved from: URL<https://web.archive.org/web/20170708065732/https://en.wikipedia.org/wiki/Smart_contract, 7 pages.

International Search Report and Written Opinion in International Application No. PCT/US2018/042064, dated Oct. 22, 2018, 15 pages.

* cited by examiner

LOGIN INFORMATION DATA PROCESSING

CROSS-REFERENCE TO RELATED APPLICATION

This application claims priority to Chinese Patent Application No. 201710574655.3, filed on Jul. 14, 2017, which is hereby incorporated by reference in its entirety.

TECHNICAL FIELD

The present application relates to the field of blockchain technologies, and in particular, to a login information data processing method and device.

BACKGROUND

With the development of Internet technologies, diverse network services can be provided for users by using an Internet service platform. Before a server corresponding to the Internet service platform provides various network services for a user, the user needs to submit login information (for example, a username and password registered with the server), so that a user identity can be verified by using the login information submitted by the user. As such, when the identity is verified, the server can provide the network service for the user, and therefore, security of the provided network service is ensured.

However, with the rapidly increasing number of Internet service platforms that can provide a network service for a user, to ensure security of login information, the login information a user can register with different Internet service platforms can be the same or different, brining inconvenience for the user to maintain the login information.

Currently, a login information processing method is provided. To be specific, different login information is stored on a third-party server that cooperates with a server corresponding to an Internet server platform. When the user needs to use the login information, the user can obtain the needed login information from the third-party server.

However, the industry needs a login information processing method that can improve login information security.

SUMMARY

Implementations of the present specification provide a login information processing method and device, to improve login information security.

The following technical solutions are used in the implementations of the present specification.

An implementation of the present specification provides a login information processing method, and the login information processing method includes: receiving a login information query request that is sent by a user and that includes an identifier; reading, from a blockchain network based on the identifier, a smart contract used for login information processing; and running the smart contract to obtain login information corresponding to the user.

An implementation of the present specification further provides a login information processing method, and the login information processing method includes: receiving a login information storage request sent by a user, where the login information storage request includes an identifier; determining login information corresponding to the user; creating, based on a predetermined smart contract template used for login information processing, a smart contract including the login information; and storing the created smart contract in a blockchain network based on the identifier.

An implementation of the present specification further provides a login information processing device, and the login information processing device includes: a receiving module, configured to receive a login information query request that is sent by a user and that includes an identifier; a reading module, configured to read, from a blockchain network based on the identifier, a smart contract used for login information processing; and a processing module, configured to run the smart contract to obtain login information corresponding to the user.

An implementation of the present specification further provides a login information processing device, and the login information processing device includes: a receiving module, configured to receive a login information storage request sent by a user, where the login information storage request includes an identifier; a determining module, configured to determine login information corresponding to the user; a creation module, configured to create, based on a predetermined smart contract template used for login information processing, a smart contract including the login information; and a storage module, configured to store the created smart contract in a blockchain network based on the identifier.

An implementation of the present specification further provides a login information processing device, and the login information processing device includes at least one processor and a memory, where the memory stores a program, and the at least one processor is configured to perform the following steps: receiving a login information query request that is sent by a user and that includes an identifier; reading, from a blockchain network based on the identifier, a smart contract used for login information processing; and running the smart contract to obtain login information corresponding to the user.

An implementation of the present specification further provides a login information processing device, and the login information processing device includes at least one processor and a memory, where the memory stores a program, and the at least one processor is configured to perform the following steps: receiving a login information storage request sent by a user, where the login information storage request includes an identifier; determining login information corresponding to the user; creating, based on a predetermined smart contract template used for login information processing, a smart contract including the login information; and storing the created smart contract in a blockchain network based on the identifier.

The at least one technical solution used in the implementations of the present specification can achieve the following beneficial effects:

In the implementations of the present specification, a smart contract including login information of a certain user can be created based on a predetermined smart contract template, and the smart contract is stored in a blockchain network, so that storage security of the login information of the user is effectively improved. The at least one technical solution is implemented based on the blockchain network, so that the login information is less likely to be lost, stolen, or tampered with, and the storage security of the login information is improved. In addition, when the user needs the login information, the user can quickly obtain the needed login information from the blockchain network through query, which makes it convenient for the user to maintain the login information.

BRIEF DESCRIPTION OF DRAWINGS

The accompanying drawings here are used to provide further understanding of the present application, and constitute a part of the present application. Example implementations of the present application and descriptions of the implementations are used to explain the present application, and do not constitute an improper limitation to the present application. In the accompanying drawings.

DESCRIPTION OF IMPLEMENTATIONS

Based on the technical solutions provided in the existing technology, login information is stored on a third-party server. However, because the third-party server stores login information of many users, there exists a risk that the login information stored on the third-party server may be leaked, reducing login information security of a user.

To improve the login information security of the user, the implementations of the present specification provide a login information processing method. The login information processing method can be performed by an information processing device. The information processing device can store login information of the user in a blockchain network, and the login information security of the user can be improved relying on the tamper-resistance and trustworthiness of the blockchain network.

Figure 1:
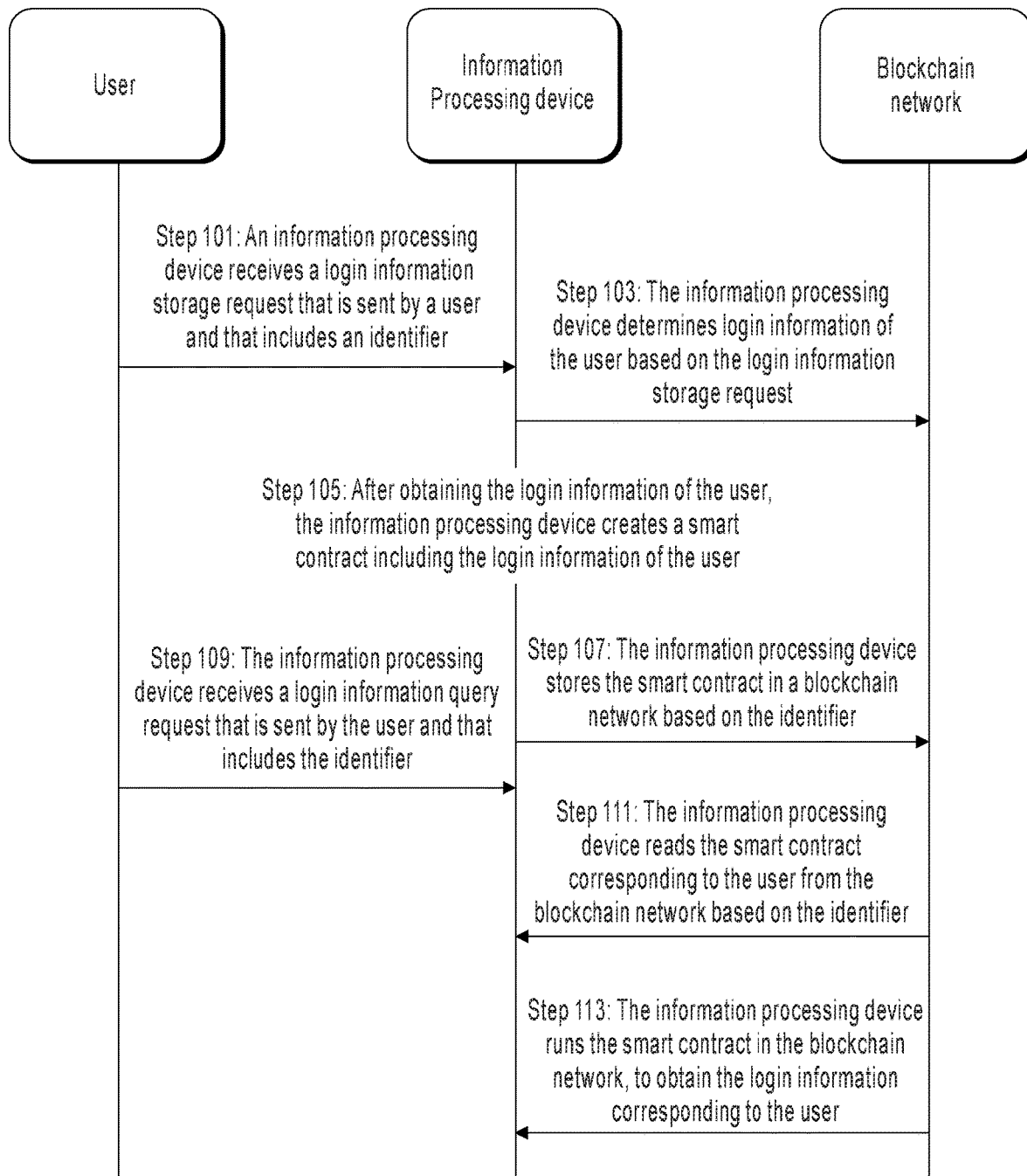
FIG. 1 is a flowchart illustrating a login information processing method, according to an implementation of the present specification.

FIG. 1 is a flowchart illustrating a login information processing method, according to an implementation of the present specification. The login information processing method includes the following steps:

Step 101: An information processing device receives a login information storage request that is sent by a user and that includes an identifier.

Step 103: The information processing device determines login information of the user based on the login information storage request.

Step 105: After obtaining the login information of the user, the information processing device creates a smart contract including the login information of the user.

Step 107: The information processing device stores the smart contract in a blockchain network based on the identifier.

Step 109: The information processing device receives a login information query request that is sent by the user and that includes the identifier.

Step 111: The information processing device reads the smart contract corresponding to the user from the blockchain network based on the identifier.

Step 113: The information processing device runs the smart contract in the blockchain network, to obtain the login information corresponding to the user.

Based on the login information processing method in the implementation of the present specification, the login information is stored in the blockchain network, and the login information can be queried and obtained from the blockchain network. The blockchain network is constructed based on a blockchain technology. The blockchain technology, referred to as a distributed account book technology, is a distributed Internet database technology that is characterized by decentralization, transparency, tamper-resistance, and trustworthiness. Therefore, the login information is less likely to be lost, stolen, or tampered with, and storage and query security of the login information is improved.

To clarify the objectives, technical solutions, and advantages of the present application, the following clearly and comprehensively describes the technical solutions of the present application with reference to specific implementations and corresponding accompanying drawings in the present application. Apparently, the described implementations are merely some but not all of the implementations of the present specification. All other implementations obtained by a person of ordinary skill in the art based on the implementations of the present application without creative efforts shall fall within the protection scope of the present application.

The technical solutions provided in the implementations of the present specification are described in detail below with reference to the accompanying drawings.

Figure 2:
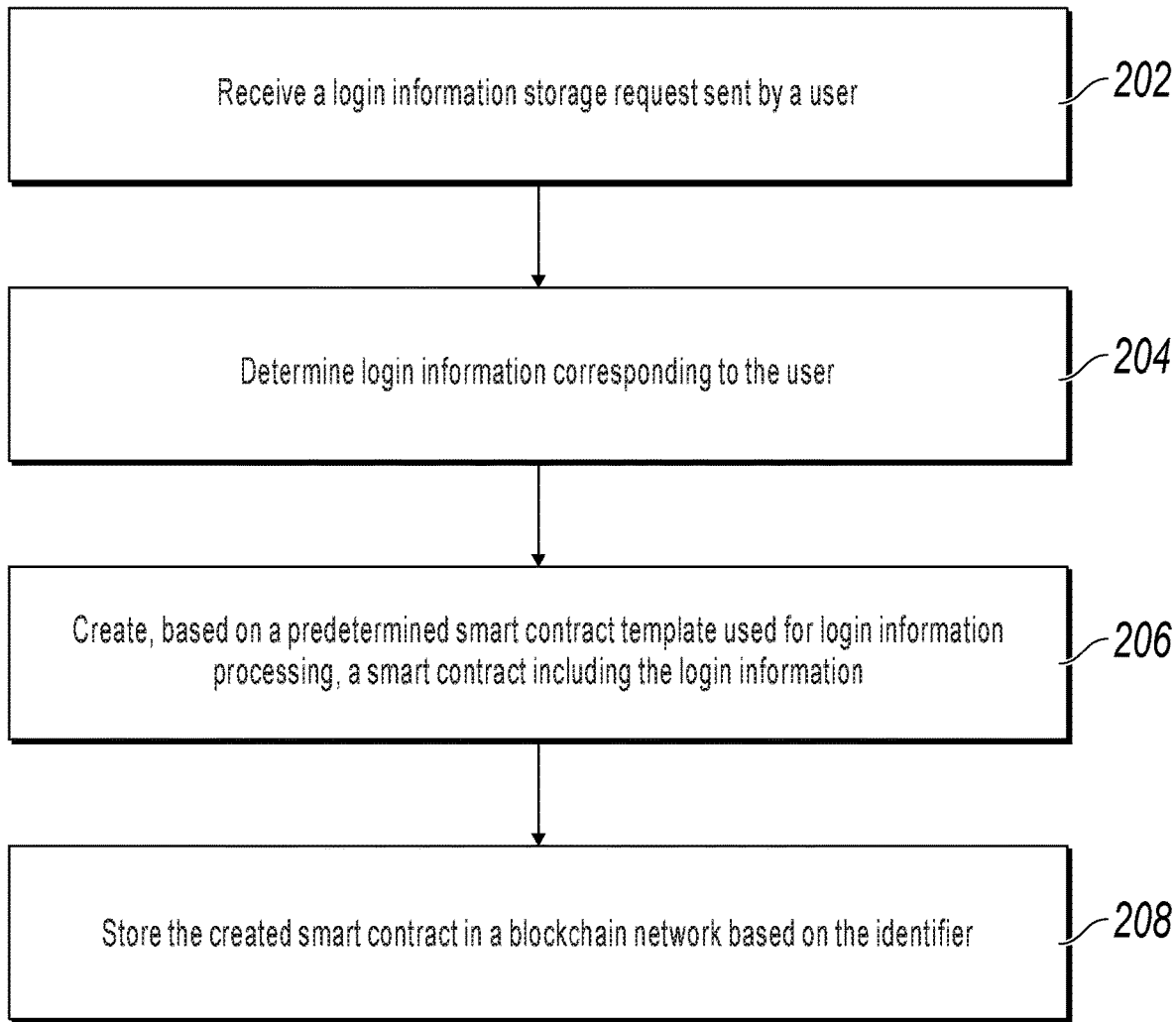
FIG. 2 is a flowchart illustrating a login information processing method, according to an implementation of the present specification.

FIG. 2 is a flowchart illustrating a login information processing method, according to an implementation of the present specification. The method is shown as follows. The present solution can be executed by an application client (which is referred to as a client below) that is capable of processing login information, or a plug-in running in a browser, or a server. An implementation form of the execution body is not limited in the implementation of the present specification.

The client is an application client that can implement the technical solution recorded in the implementation of the present specification, and can run on a terminal device as a software application (or APP).

Step 202: Receive a login information storage request sent by a user, where the login information storage request includes an identifier.

In actual application, when the user needs a network service provided by a certain Internet service platform, the user usually needs to log in to the Internet service platform. When the user logs in to the Internet service platform for the first time, the user needs to register with the Internet service platform, to generate login information used by the user to log in to the Internet service platform.

To make it convenient for the user to log in to the Internet service platform subsequently, the user can send the login information storage request to an information processing device after obtaining the login information, so that the information processing device processes the login information of the user (the processing here can include storage, query, etc.). The information processing device can be a login information processing device, or an information processing device that has a login information processing capability and also other capabilities.

The identifier recorded in the implementation of the present specification can be understood as information that is easily to be remembered by the user, also after the identifier is received, the login information of a user who provides the identifier can be identified. The identifier here can be a password, an image, a character string, a two-dimensional code, etc., which is not limited. If the identifier is a password, the password can consist of one or more of a number, a Chinese character, a letter, or a symbol.

In addition, the identifier recorded in the implementation of the present specification can be set by the user, or can be set by the information processing device or the Internet service platform for the user, which is not limited here.

Step 204: Determine login information corresponding to the user.

In the implementation of the present specification, the login information corresponding to the user can be set by the user, or can be automatically generated by the information processing device for the user, which is not limited here.

If the login information corresponding to the user is set by the user, the determining login information corresponding to the user includes: determining, as the login information corresponding to the user, login information included in the login information storage request.

If the login information storage request does not include the login information, after the information processing device receives the login information storage request sent by the user, the determining login information corresponding to the user includes: generating login information for the user; and determining the generated login information as the login information corresponding to the user.

The information processing device randomly and irregularly generates login information for different users, so that the login information cannot be easily cracked, and has high security.

The login information recorded in the implementation of the present specification can include a username and a login password that are set by the user or the information processing device, or can include only a login password that is set by the user or the information processing device. If the login information includes only the login password, a username is usually set by the user.

Step 206: Create, based on a predetermined smart contract template used for login information processing, a smart contract including the login information.

In the implementation of the present specification, the information processing device pre-generates the smart contract template used for login information processing. The processing logic used for login information processing is recorded on the smart contract template. To be specific, the login information can be processed by executing the processing logic.

For example, the logic for processing the login information can include logic for storing the login information. The login information can be stored in a blockchain network based on the storage logic.

For another example, the logic for processing the login information can include logic for querying the login information. The login information can be queried from a blockchain network based on the query logic.

For yet another example, the logic for processing the login information can include logic for updating or deleting the login information. Stored login information can be updated based on the updating logic, and stored login information can be deleted based on the deletion logic.

Notably, updating and deleting here can be understood as generating service data related to updating in the blockchain network (to be specific, both to-be-updated login information and updated login information are stored in the blockchain network) and generating service data related to deleting.

In the implementation of the present specification, the predetermined smart contract template used for login information processing can be stored on the information processing device, or can be stored in the blockchain network, which is not limited here.

If the smart contract template is stored on the information processing device, after determining the login information corresponding to the user, the information processing device invokes the smart contract template, and creates the smart contract including the login information corresponding to the user. If the smart contract template is stored in the blockchain network (To be specific, the information processing device creates the smart contract template in the blockchain network by negotiating with the blockchain network. In other words, the blockchain network allocates a fixed storage address to the smart contract template, and stores the smart contract template in the blockchain network based on the fixed storage address, and the information processing device can obtain the smart contract template based on the fixed storage address.), after determining the login information corresponding to the user, the information processing device invokes the smart contract template from the blockchain network, and creates the smart contract including the login information corresponding to the user.

To improve login information security, the smart contract can be created based on encrypted login information. In the implementation of the present specification, the creating a smart contract including the login information can include: processing the identifier to obtain a private-public key pair; encrypting the login information by using a public key in the private-public key pair; and creating, based on the predetermined smart contract template used for login information processing, a smart contract including the encrypted login information.

The processing the identifier to obtain a private-public key pair can include: converting the identifier into a bytecode based on a conversion rule, for example, selecting a binary code as the bytecode; and generating the private-public key pair by using the bytecode based on calculation logic, where the private-public key pair is formed by a public key and a private key, the public key is used to encrypt login information, and the private key can be used to decrypt encrypted login information.

When the smart contract is created for the login information, if the login information storage request includes identification information, a smart contract including the identification information and the login information is created.

The identification information here can be understood as identification information of the Internet service platform.

Step 208: Store the created smart contract in a blockchain network based on the identifier.

In the implementation of the present specification, the storing the created smart contract in a blockchain network based on the identifier can include: determining a storage address of the smart contract in the blockchain network based on the identifier; and storing the smart contract in the blockchain network based on the storage address.

In the implementation of the present specification, the determining a storage address of the smart contract in the blockchain network based on the identifier includes: processing the identifier to obtain a private-public key pair; obtaining a first address through calculation based on a public key included in the private-public key pair; obtaining a second address based on the first address, where the second address is determined in the blockchain network based on a specified transaction event initiated at the first address; and determining the second address as the storage address of the smart contract in the blockchain network.

The specified transaction event recorded in the implementation of the present specification can be understood as a transaction. For example, in the Ethereum network, to obtain the storage address of the smart contract, a particular amount of Ether needs to be paid to the Ethereum network. To be specific, when a transaction is generated in the Ethereum network, a source address of the transaction can be the first address, and a destination address of the transaction can be referred to as the second address (the second address here can be allocated in the Ethereum network). Once the transaction between the first address and the second address is completed, storage space corresponding to the second address can be used to store the smart contract created for the user. In this situation, the second address can also be referred to as the storage address of the smart contract.

Refer to the processing the identifier to obtain a private-public key pair in step 206. Details are not described here. The obtaining a first address through calculation based on a public key included in the private-public key pair includes: calculating, based on a specified algorithm, the public key included in the private-public key pair, to obtain the first address, which includes: calculating the public key based on a hash algorithm, to obtain a hash value of a fixed length, where the hash value is the first address.

Based on the login information processing method provided in the implementation of the present specification, a smart contract including login information of a certain user can be created, and the smart contract is stored in a blockchain network, so that storage security of the login information of the user is effectively improved. This is implemented based on the blockchain network, so that the login information is less likely to be lost, stolen, or tampered with, and storage security of the login information is improved.

Figure 3:
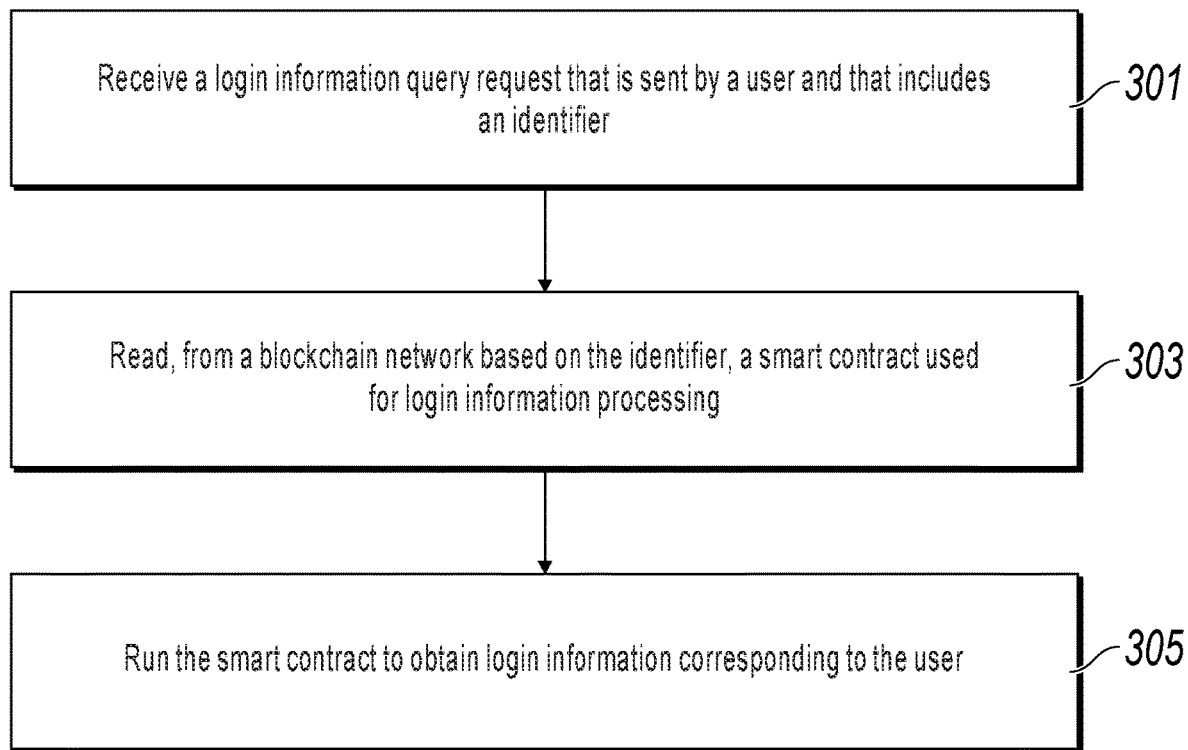
FIG. 3 is a flowchart illustrating a login information processing method, according to an implementation of the present specification.

FIG. 3 is a flowchart illustrating a login information processing method, according to an implementation of the present specification. The method is shown as follows. The present solution can be executed by an application client (which is referred to as a client below) with a login information processing capability, or a plug-in running in a browser, or a server. An implementation form of the execution body is not limited in the implementation of the present specification.

Step 301: Receive a login information query request that is sent by a user and that includes an identifier.

In the implementation of the present specification, when logging in to an Internet service platform, the user can send the login information query request to an information processing device, to obtain needed login information. When the user needs login information, the user can send the login information query request to an information processing device, to obtain the needed login information. A use scenario of sending the login information query request by the user is not limited here.

For content of the identifier, refer to related content recorded in the described implementation. Details are not described here.

Step 303: Read, from a blockchain network based on the identifier, a smart contract used for login information processing.

In the implementation of the present specification, a storage address of the smart contract used for login information processing is first determined based on the identifier.

The identifier is processed to obtain a private-public key pair. A first address is obtained through calculation based on a public key included in the private-public key pair. At least one second address making a transaction with the first address is determined based on the first address. The storage address of the smart contract is identified from the second address.

In the implementation of the present specification, for the processing the identifier to obtain a private-public key pair, refer to content in step 208. Details are not described here.

The obtaining a first address through calculation based on a public key included in the private-public key pair includes: calculating, based on a specified algorithm, the public key included in the private-public key pair, to obtain the first address.

In the implementation of the present specification, the storage address of the smart contract can be determined by using a specified transaction event. After the transaction event occurs, transaction data corresponding to the transaction event is stored in the blockchain network. As such, the first address can be used as a query keyword, transaction data including the first address is queried in the blockchain network, and the at least one second address is read from the transaction data.

For the same user, because the first address is determined based on the identifier provided by the user, there can be one or more transaction data including the first address, and each transaction data includes the second address. Therefore, the at least one second address can be determined based on the first address.

The identifying the storage address of the smart contract from the second addresses can include: if it is determined that there is one second address making a transaction with the first address, determining the second address as the storage address of the smart contract; or if it is determined that there is more than one second address making a transaction with the first address, searching for a second address that the smart contract is stored at, and determining the identified second address as the storage address of the smart contract. In this situation, there can be one or more storage addresses of the smart contract.

The smart content is then read from the blockchain network based on the storage address.

If one smart contract is read from the blockchain network, it is determined that the smart contract is a smart contract corresponding to the user.

If more than one smart contract is read from the blockchain network, a smart contract satisfying a specified condition is selected from the read smart contracts.

In the implementation of the present specification, the selecting, from the read smart contracts, a smart contract satisfying a specified condition includes: selecting, from the read smart contracts based on identification information included in the read smart contracts, a smart contract with the same identification information as identification information included in the login information query request.

Step 305: Run the smart contract to obtain login information corresponding to the user.

In the implementation of the present specification, the smart contract is run, to obtain at least one login information.

The at least one login information is fed back to the user, so that the user confirms login information satisfying a user need.

In the implementation of the present specification, one or more login information can be stored in the smart contract.

If one login information is obtained by running the smart contract, it can be determined that the login information satisfies the user need, and the login information is directly fed back to the user.

If more than one login information is obtained by running the smart contract, the login information can be fed back to the user for confirmation.

Alternatively, when the login information includes identification information, the identification information is parsed from each login information, so as to select the login information with the same identification information as the identification information included in the login information query request, and determine that the selected login information satisfies the user need.

The login information stored in the smart contract can be unencrypted or encrypted. For the encrypted login information, the running a smart contract to obtain login information corresponding to the user includes: running the smart contract to obtain the encrypted login information; and decrypting the encrypted login information to obtain the login information corresponding to the user.

The decrypting the encrypted login information includes: processing the identifier to obtain a private-public key pair; and decrypting the encrypted login information by using a private key in the private-public key pair.

Based on an implementation in step 206, the private-public key pair is generated by using the identifier, and the login information is encrypted by using a public key in the private-public key pair. In the present step, the login information encrypted by using the public key can be decrypted by using the private key in the private-public key pair.

Plaintext of the obtained login information is sent to the user, and the user can use the login information to complete login.

In the implementation of the present specification, the user can further send a login information processing request to the information processing device. In this situation, after the login information is obtained, the login information processing method further includes: processing the login information based on a received processing request; and if the received processing request is an update request, updating the login information, and storing the updated login information in the blockchain network; or if the received processing request is a deletion request, deleting the login information from the blockchain network.

Based on the login information processing method provided in the implementation of the present specification, when a user needs login information, the user can quickly obtain the needed login information from a blockchain network through query, making it convenient for the user to maintain the login information.

Figure 4:
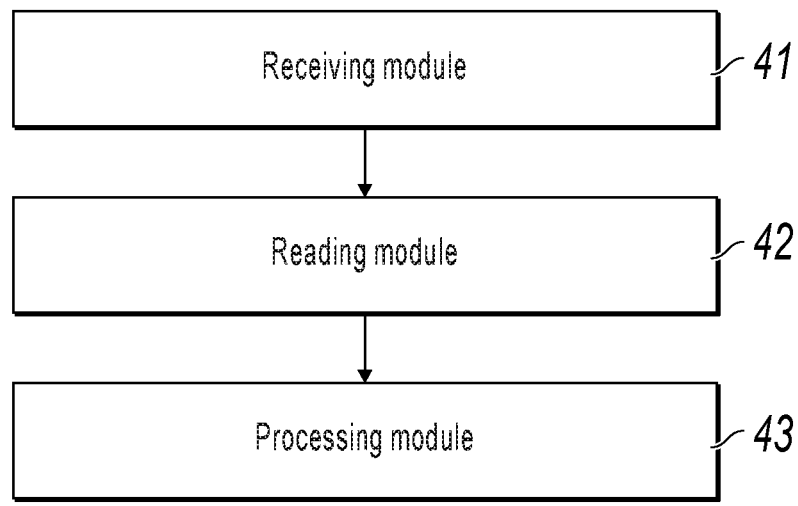
FIG. 4 is a structural diagram illustrating a login information processing device, according to an implementation of the present specification.

FIG. 4 is a structural diagram illustrating a login information processing device, according to an implementation of the present specification. The login information processing device includes: a receiving module 41, configured to receive a login information query request that is sent by a user, where the request includes an identifier; a reading module 42, configured to read, from a blockchain network based on the identifier, a smart contract used for login information processing; and a processing module 43, configured to run the smart contract to obtain login information corresponding to the user.

Optionally, the reading module 42 is configured to: determine, based on the identifier, a storage address of the smart contract that is used for processing login information; and read the smart contract from the blockchain network based on the storage address.

Optionally, the reading module 42 is configured to: process the identifier to obtain a private-public key pair; obtain a first address through calculation based on a public key included in the private-public key pair; determine, based on the first address, at least one second address making a transaction with the first address; and identify the storage address of the smart contract from the second addresses.

Optionally, the reading module 42 is configured to: calculate, based on a specified algorithm, the public key included in the private-public key pair, to obtain the first address.

Optionally, the reading module 42 is configured to: if more than one smart contract is read from the blockchain network, select, from the read smart contracts, a smart contract satisfying a specified condition.

Optionally, the reading module 42 is configured to: select, from identification information included in the read smart contracts, a smart contract with the same identification information as identification information included in the login information query request.

Optionally, the processing module 43 is configured to: run the smart contract to obtain at least one login information corresponding to a user; and feedback the at least one login information to the user, so that the user confirms login information has satisfied a user need.

Optionally, the processing module 43 is configured to: run the smart contract to obtain encrypted login information corresponding to a user; and decrypt the encrypted login information to obtain the login information corresponding to the user.

Optionally, the processing module 43 is configured to: process the identifier to obtain a private-public key pair; and decrypt the encrypted login information by using a private key in the private-public key pair.

Optionally, after the login information is obtained, the processing module 43 processes the login information based on a received processing request.

Optionally, the processing module 43 is configured to: if the received processing request is a request for update, update the login information, and store the updated login information in the blockchain network.

Optionally, the processing module 43 is configured to: if the received processing request is a request for deletion, delete the login information from the blockchain network.

Notably, the login information processing device recorded in the implementation of the present specification can be implemented by using software or hardware, which is not limited here.

As such, the user can query the login information from the blockchain network by using the login information processing device, and further process the login information. The login information processing device (which can be referred to as an information processing device for short) can have a single login information processing function, or can have other information processing functions in addition to a login information processing function.

Based on a same disclosure concept, an implementation of the present specification further provides a login information processing device. The login information processing device includes at least one processor and a memory. The memory stores a program, and the at least one processor is configured to perform the following steps: receiving a login information query request that is sent by a user and that includes an identifier; reading, from a blockchain network based on the identifier, a smart contract used for login information processing; and running the smart contract to obtain login information corresponding to the user.

For another function of the processor, refer to content recorded in the implementation described above. Details are not described here.

Based on a same disclosure concept, an implementation of the present specification further provides a computer-readable storage medium. The computer-readable storage medium includes a program used in combination with an electronic device, and a processor can execute the program to perform the following steps: receiving a login information query request that is sent by a user and that includes an identifier; reading, from a blockchain network based on the identifier, a smart contract used for login information processing; and running the smart contract to obtain login information corresponding to the user.

For another function of the processor, refer to content recorded in the implementation described above. Details are not described here.

As such, the computer-readable storage medium provides a carrier of a method for querying the login information from the blockchain network.

Figure 5:
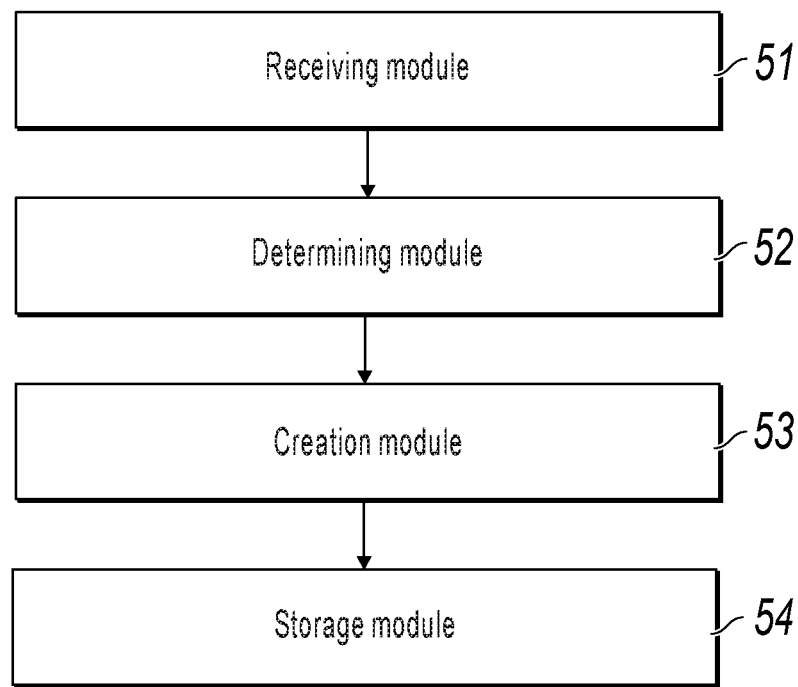
FIG. 5 is a structural diagram illustrating a login information processing device, according to an implementation of the present specification.

FIG. 5 is a structural diagram illustrating a login information processing device, according to an implementation of the present specification. The login information processing device includes: a receiving module 51, configured to receive a login information storage request sent by a user, where the login information storage request includes an identifier; a determining module 52, configured to determine login information corresponding to the user; a creation module 53, configured to create, based on a predetermined smart contract template used for login information processing, a smart contract including the login information; and a storage module 54, configured to store the created smart contract in a blockchain network based on the identifier.

Optionally, the determining module 52 is configured to: generate login information for the user; and determine the generated login information as the login information corresponding to the user.

Optionally, the determining module 52 is configured to: determine, as the login information corresponding to the user, login information included in the login information storage request.

Optionally, the storage module 54 is configured to: determine a storage address of the smart contract in the blockchain network based on the identifier; and store the smart contract in the blockchain network based on the storage address.

Optionally, the storage module 54 is configured to: process the identifier to obtain a private-public key pair; obtain a first address through calculation based on a public key included in the private-public key pair; obtain a second address based on the first address, where the second address is determined in the blockchain network based on a specified transaction event initiated at the first address; and determine the second address as the storage address of the smart contract in the blockchain network.

Optionally, the storage module 54 is configured to: calculate, based on a specified algorithm, the public key included in the private-public key pair, to obtain the first address.

Optionally, the creation module 53 is configured to: process the identifier to obtain a private-public key pair; encrypt the login information by using a public key in the private-public key pair; and create, based on the predetermined smart contract template used for login information processing, a smart contract including the encrypted login information.

Notably, the login information processing device recorded in the implementation of the present specification can be implemented by using software or hardware, which is not limited here.

As such, the user can store the login information in the blockchain network by using the login information processing device. The login information processing device can have a single login information processing function, or can have other information processing functions in addition to a login information processing function.

Based on a same disclosure concept, an implementation of the present specification further provides a login information processing device. The login information processing device includes at least one processor and a memory. The memory stores a program, and the at least one processor is configured to perform the following steps: receiving a login information storage request sent by a user, where the login information storage request includes an identifier; determining login information corresponding to the user; creating, based on a predetermined smart contract template used for login information processing, a smart contract including the login information; and storing the created smart contract in a blockchain network based on the identifier.

For another function of the processor, refer to content recorded in the described implementation. Details are not described here.

Based on a same disclosure concept, an implementation of the present specification further provides a computer-readable storage medium. The computer-readable storage medium includes a program used in combination with an electronic device, and a processor can execute the program to perform the following steps: receiving a login information storage request sent by a user, where the login information storage request includes an identifier; determining login information corresponding to the user; creating, based on a predetermined smart contract template used for login information processing, a smart contract including the login information; and storing the created smart contract in a blockchain network based on the identifier.

For another function of the processor, refer to content recorded in the described implementation. Details are not described here.

As such, the user can store the login information in the blockchain network through interaction with the login information processing device or the computer-readable storage medium.

In the 1990s, improvement of a technology can be clearly distinguished between hardware improvement (for example, improvement on a circuit structure such as a diode, a transistor, or a switch) and software improvement (improvement on a method procedure). However, with the development of technologies, improvement of many method processes can be considered as a direct improvement of a hardware circuit structure. Designers almost all program an improved method procedure to a hardware circuit, to obtain a corresponding hardware circuit structure. Therefore, it cannot be said that an improvement of a method procedure cannot be implemented by using a hardware entity module. For example, a programmable logic device (PLD) (for example, a field programmable gate array (FPGA)) is such an integrated circuit. A logical function of the programmable logic device is determined by component programming executed by a user. The designers perform voluntary programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specific programming language, which is referred to as a hardware description language (HDL), and there is more than one type of HDL, such as an ABEL (Advanced Boolean Expression Language), an AHDL (Altera Hardware Description Language), Confluence, a CUPL (Cornell University Programming Language), an HDCal, a JHDL (Java Hardware Description Language), a Lava, a Lola, a MyHDL, a PALASM, and an RHDL (Ruby Hardware Description Language), etc. Currently, VHDL (Very-High-Speed Integrated Circuit Hardware Description Language) and Verilog are most commonly used. A person skilled in the art should also understand that a method procedure only needs to be logically programmed, and programmed to the integrated circuit by using the foregoing hardware description languages, so that a hardware circuit that implements the logical method process can be easily obtained.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer-readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented in a manner of pure computer-readable program code, and the steps in the method can be logically programmed to enable the controller to further implement same functions in forms of a logic gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure in the hardware component. Alternatively, an apparatus configured to implement various functions can be considered as both a software module for implementing the method and a structure in the hardware component.

The system, apparatus, module, or unit described in the described implementations can be implemented by a computer chip or an entity, or implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. Certainly, when the present application is implemented, the functions of the units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

These computer program instructions can be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts or in one or more blocks in the block diagrams.

In typical configuration, the computing device includes one or more central processing units (CPU), an input/output interface, a network interface, and a memory.

The memory can include a form of a volatile memory, a random access memory (RAM) and/or a non-volatile memory, etc. in a computer-readable medium, such as a read-only memory (ROM) or a flash memory (flash RAM). The memory is an example of the computer-readable medium.

The computer-readable medium includes volatile and non-volatile, removable and non-removable media, and can store information by using any method or technology. The information can be a computer-readable instruction, a data structure, a program module, or other data. A computer storage medium includes but is not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission media that can be used to store information that can be accessed by the computing device. As defined in the present specification, the computer-readable medium does not include transitory media, for example, a modulated data signal and a carrier.

Notably, terms "include", "contain", or their any other variants are intended to cover non-exclusive inclusion, so that a process, a method, an article, or a device that includes a series of elements not only includes these elements, but also includes other elements which are not expressly listed, or further includes elements inherent to such a process, method, article, or device. When there are no more restrictions, it is also possible that there is another same or equivalent element in the process, the method, a product, or a device that includes the element.

The present application can be described in the general context of computer executable instructions executed by a computer, such as a program module. Generally, the program module includes a routine, a program, an object, a component, a data structure, etc. for executing a specific task or implementing a specific abstract data type. The present application can also be practiced in distributed computing environments in which tasks are performed by remote processing devices that are connected by using a communications network. In a distributed computing environment, the program module can be located in both local and remote computer storage media that include storage devices.

The implementations in the present specification are all described in a progressive manner, for the same or similar parts in the implementations, refer to each other, and each implementation focuses on a difference from other implementations. Particularly, since a system implementation is similar to a method implementation, and therefore is described briefly; and for the relevant parts, reference can be made to partial descriptions of the method implementation.

The previous descriptions are merely implementations of the present application, and are not intended to limit the present application. For a person skilled in the art, the present application can have various modifications and changes. Any modifications, equivalent replacements, improvements, etc. made within the spirit and principle of the present application shall fall within the scope of the claims of the present application.

Figure 6:
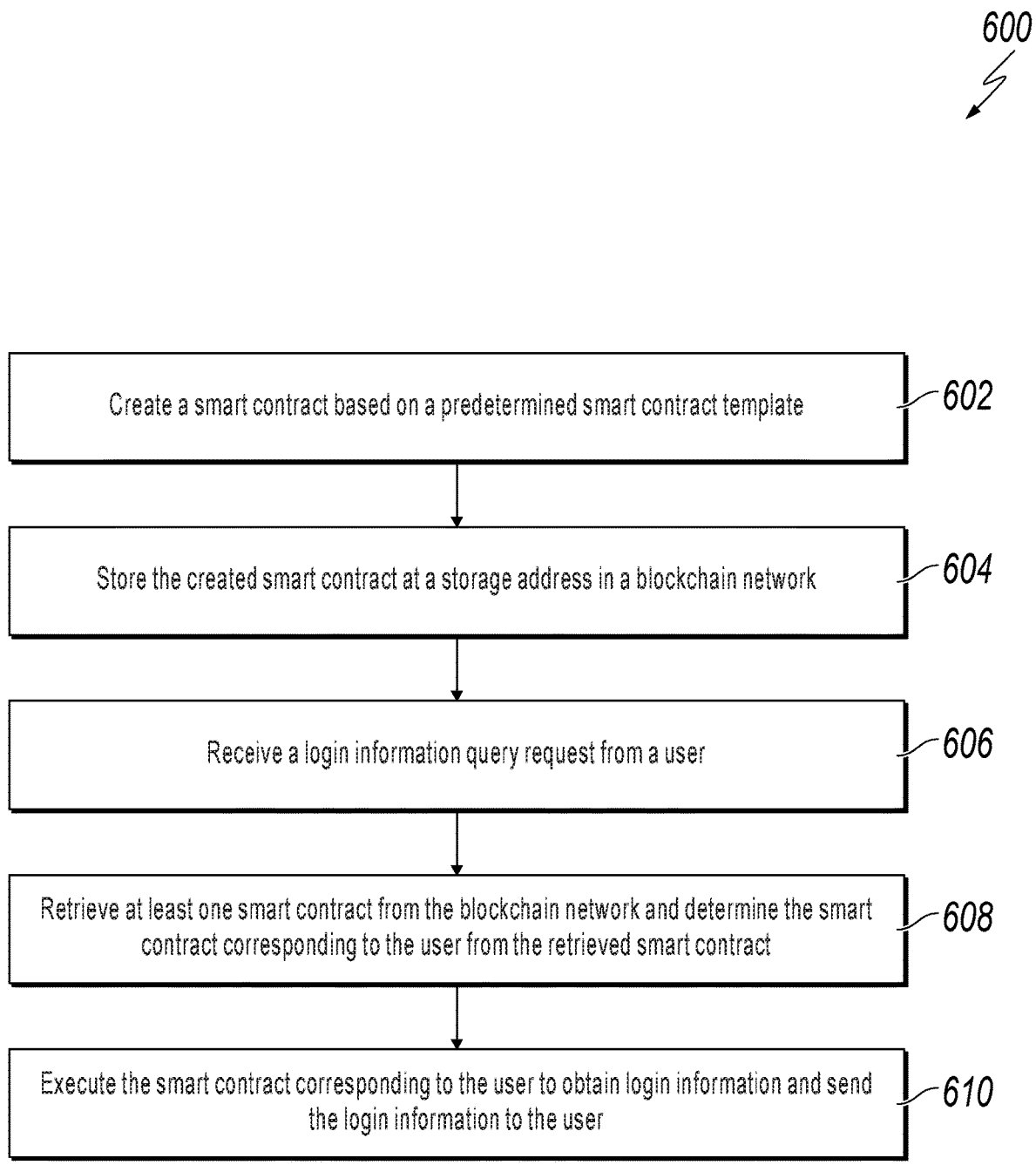
FIG. 6 is a flowchart illustrating an example of a computer-implemented method for processing login information data, according to an implementation of the present disclosure.

FIG. 6 is a flowchart illustrating an example of a computer-implemented method 600 for login information data processing, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a smart contract is created by an information-processing device based on a predetermined smart contract template. The created smart contract includes login information corresponding to a user. The login information is determined based on a login information storage request sent from the user, and the login information storage request includes an identifier. In some implementations, the information-processing device can be an application client that is capable of processing login information. The application client can implement the technical solution recorded in the implementation of the present specification, and can run on a terminal device as an APP. In some implementations, the information-processing device can also be a plug-in running a browser, or by a server.

When a user needs a network service provided by a certain Internet service platform, the user usually needs to log in to the Internet service platform. When the user logs in to the Internet service platform for the first time, the user needs to register with the Internet service platform, to generate login information used by the user to log in to the Internet service platform. To make it convenient for the user to log in to the Internet service platform, the user can send a login information storage request to an information processing device after obtaining the login information, so that the information processing device processes the login information (for example, storing or querying). The information processing device can be a login information processing device, or an information processing device that has a login information processing capability and other capabilities consistent with this disclosure.

In some implementations, login information corresponding to a user can be set by the user, or can be automatically generated by the information-processing device for the user. The information-processing device can, on a random basis, generate login information for different users, so that the login information is secure and cannot be easily determined.

A recorded identifier is information that is easily remembered by a user. After the identifier is received, login information of a user providing the identifier can be identified. In some implementations, the identifier can be, but not limited to, a password, an image, a character string, or a two-dimensional code. If the identifier is a password, the password can include one or more of a number, a Chinese character, a letter, or a symbol. In addition, the recorded identifier can be set for the user by the user, the information-processing device, or the Internet service platform for the user.

In some implementations, the information processing device can pre-generate the smart contract template used for login information processing. Processing logic used for login information processing is recorded on the smart contract template. Specifically, the login information can be processed by executing the processing logic. For example, the logic for processing the login information can include logic for storing the login information. The login information can be stored in a blockchain network based on the storage logic. In another example, the logic for processing the login information can include logic for querying the login information. The login information can be queried from a blockchain network based on the query logic. In yet another example, the logic for processing the login information can include logic for updating or deleting the login information. Stored login information can be updated based on the updating logic, and stored login information can be deleted based on the deletion logic. Updating and deleting can be understood as generating service data related to updating in the blockchain network (for example, to-be-updated login information and updated login information are stored in the blockchain network) and generating service data related to deleting.

In some implementations, the predetermined smart contract template used for login information processing can be stored on the information-processing device. In some implementations, the predetermined smart contract template can be, or can be stored in, the blockchain network. The information processing device creates the smart contract template in the blockchain network by negotiating with the blockchain network. The blockchain network allocates a fixed storage address to the smart contract template, and stores the smart contract template in the blockchain network based on the fixed storage address. The information processing device can obtain the smart contract template based on the fixed storage address.

In some implementations, to improve login information security, the smart contract can be created based on encrypted login information. For example, creating a smart contract including the login information can include: processing the identifier to obtain a private-public key pair; encrypting the login information by using a public key in the private-public key pair; and creating, based on the predetermined smart contract template used for login information processing, a smart contract including the encrypted login information. In some implementations, processing the identifier to obtain a private-public key pair can include: converting the identifier into a bytecode based on a conversion rule, for example, selecting a binary code as the bytecode; and generating the private-public key pair by using the bytecode based on calculation logic, where the private-public key pair is formed by a public key and a private key, the public key is used to encrypt login information, and the private key can be used to decrypt encrypted login information.

In some implementations, if the login information storage request includes identification information (for example, the identification information of the Internet service platform), the created smart contract also includes that identification information. From 602, method 600 proceeds to 604.

At 604, the created smart contract is stored at a storage address in a blockchain network based on the identifier associated with the login information storage request. In some implementations, to store the smart contract, a storage address is first determined, and then the smart contract is stored at the determined storage address.

In some implementations, to determine the storage address of each smart contract, the identifier is first processed to obtain a private-public key pair; obtaining a first address based on a public key in the private-public key pair, and the first address is obtained by calculating the public key based on an algorithm. For example, the public key can be calculated based on a hash algorithm, to obtain a hash value of a fixed length, where the hash value is the first address. Then a second address based on the first address can also be determined, and the second address is determined by the blockchain network based on a specified transaction event initiated at the first address. Finally, the second address is determined as the storage address of the smart contract in the blockchain network. In some implementations, the specified transaction event can be understood as a transaction. For example, in the Ethereum network, to obtain the storage address of the smart contract, a particular amount of Ether needs to be paid to the Ethereum network. Specifically, when a transaction is generated in the Ethereum network, a source address of the transaction can be the first address, and a destination address of the transaction can be referred to as the second address (the second address can be allocated in the Ethereum network). Once the transaction between the first address and the second address is completed, storage space corresponding to the second address can be used to store the smart contract created for the user. Here, the second address can also be referred to as the storage address of the smart contract. From 604, method 600 proceeds to 606.

At 606, a login information query request is received from a user and at the information-processing device. The login information query request comprises an identifier.

In some implementations, when logging in to an Internet service platform, the user can send the login information query request to an information-processing device, to obtain needed login information. When the user needs login information, the user can send the login information query request to an information-processing device, to obtain the needed login information. A use scenario of sending the login information query request by the user is not limiting. From 606, method 600 proceeds to 608.

At 608, based on the identifier associated with the login information query request, at least one smart contract is retrieved from the blockchain network. The smart contract corresponding to the user is determined from the at least one retrieved smart contract.

In some implementations, to retrieve the smart contract from the storage address in the blockchain network, a storage address of the smart contract used for login information processing is first determined based on the identifier. For example, the identifier that is associated with the login information query request is first processed to obtain a private-public key pair. A first address can be obtained based on a public key in the private-public key pair. The first address can be obtained by calculating the public key based on an algorithm. Based on the first address, at least one second address can be obtained and each of the second address performing a transaction with the first address. Specifically, after a specified transaction event occurs, transaction data corresponding to the transaction event is stored in the blockchain network. The first address can be used as a query keyword, transaction data including the first address can be queried in the blockchain network, and the at least one second address can be read from the transaction data. For the same user, because the first address is determined based on the identifier provided by the user, transaction data can include the first address and the second address). Accordingly, the at least one second address can be determined based on the first address, and a storage address of the smart contract can be identified from the determined at least one second address. Finally, at least one smart contract can be retrieved from the storage address.

In some implementations, if it is determined that there is one second address performing a transaction with the first address, determining the second address as the storage address of the smart contract; or if it is determined that there is more than one second address performing a transaction with the first address, searching for a second address that the smart contract is stored at, and determining the identified second address as the storage address of the smart contract. In this situation, there can be one or more storage addresses of the smart contract, and one or more smart contract can be retrieved accordingly.

In some implementations, if one smart contract is read from the blockchain network, it is determined that the smart contract is a smart contract corresponding to the user. In some implementations, if more than one smart contract is retrieved from the blockchain network, a smart contract that satisfies a specified condition can be selected from the retrieved smart contracts. For example, a smart contract with the same identification information as identification information included in the login information query request can be selected from the retrieved smart contracts. From 608, method 600 proceeds to 610.

At 610, the retrieved smart contract is executed to obtain login information corresponding to the user. The obtained login information can then be sent back to the user. The obtained login information, for example, in a form of plain text, can be sent to the user, so the user can use the login information to complete a login.

In some implementations, if login information is obtained by executing the smart contract, it can be determined that the login information satisfies the user's need, and the login information can be provided to the user. In some implementations, if multiple login information data is obtained by executing the smart contract, the login information can be provided to the user for confirmation.

Alternatively, in some implementations, when the login information includes identification information, the identification information can be parsed from the login information, so as to select particular login information with the same identification information as the identification information included in the login information query request, and determine that the selected login information satisfies the user's need.

In some implementations, where the login information stored in the smart contract is encrypted, to execute the smart contract and to obtain login information corresponding to the user, the smart contract is first executed to obtain encrypted login information. The identifier associated with the login information query request can be processed to obtain a private-public key pair. The encrypted login information can be further decrypted by using a private key in the private-public key pair to obtain decrypted login information. The obtained decrypted login information can be provided to the user, and the user can confirm the received login information.

In some implementations, the user can send a login information processing request to an information processing device. Here, the obtained login information can be further processed based on the received processing request. In some implementations, if the received processing request is an updating request, the login information can be updated, and the updated login information can be stored in the blockchain network. In some implementations, if the received processing request is a deletion request, the login information can be deleted from the blockchain network. After 610, method 600 stops.

Implementations of the present application can solve technical problems in processing login information. In existing technology, login information is stored on a third-party server. However, because the third-party server stores login information for many users, there exists a risk that the stored login information can be improperly disclosed or accessed, reducing login information security for a user. The described methodology permits bypassing this issue to improve login information data security.

Implementations of the present specification describes a login information processing method. The login information processing method can be performed by an information processing device. Based on the login information processing method provided in the implementation of the present specification, a smart contract including login information of a certain user can be created, and the smart contract is stored in a blockchain network. The login information then can be queried and obtained from the blockchain network. The blockchain network is constructed based on a blockchain technology. The blockchain technology, referred to as a distributed account book technology, is a distributed Internet database technology that is characterized by decentralization, transparency, tamper-resistance, and trustworthiness. The disclosed solution in this disclosure is implemented based on the blockchain network, so that the login information is less likely to be lost, stolen, or tampered with, and storage security of the login information is effectively improved. Further, based on the login information processing method provided in the implementation of the present specification, when a user needs login information, the user can quickly obtain the needed login information from a blockchain network through query, making it convenient for the user to maintain the login information.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    creating, at an information-processing device, a smart contract based on a predetermined smart contract template, wherein the smart contract comprises login information corresponding to a user, wherein the login information is determined based on a login information storage request sent from the user, and wherein the login information storage request comprises an identifier;
    processing the identifier to obtain a private-public key pair;
    obtaining a first address in a blockchain network through calculation based on a public key of the private-public key pair;
    obtaining a storage address in the blockchain network based on a specified transaction event initiated at the first address;
    storing the created smart contract at the storage address;
    receiving a login information query request from the user, wherein the login information query request comprises the identifier;
    retrieving at least one smart contract from the blockchain network based on the identifier, and determining a smart contract corresponding to the user from the at least one retrieved smart contract; and
    executing the smart contract corresponding to the user to obtain at least one login information, and sending the obtained at least one login information to the user.

2. The computer-implemented method of claim 1, wherein the login information storage request comprises the login information, and wherein creating the smart contract based on the predetermined smart contract template comprises:
    encrypting the login information by using the public key in the private-public key pair; and
    creating, based on the predetermined smart contract template, the smart contract, wherein the smart contract comprises the encrypted login information.

3. The computer-implemented method of claim 1, wherein retrieving the at least one smart contract from the blockchain network comprises:
    obtaining a first retrieval address through calculation based on the public key in the private-public key pair;
    determining, based on the first address, at least one second retrieval address, wherein each of the at least one second retrieval addresses performs a transaction with the first address; and retrieving the at least one smart contract from one of the at least one second retrieval addresses.

4. The computer-implemented method of claim 1, wherein determining the smart contract corresponding to the user from the retrieved at least one smart contracts comprises:
if one smart contract is retrieved from the blockchain network, that smart contract is determined as the smart contract corresponding to the user; and
if more than one smart contracts are retrieved from the blockchain network, a retrieved smart contract that satisfies a specified condition is determined as the smart contract corresponding to the user.

5. The computer-implemented method of claim 1, wherein the login information contained in the smart contract is encrypted, and wherein executing the smart contract to obtain the at least one login information comprises:
executing the smart contract to obtain encrypted login information;
decrypting the encrypted login information by using a private key of the private-public key pair to obtain decrypted login information; and
feeding back the decrypted login information to the user, wherein the decrypted login information can be confirmed by the user.

6. The computer-implemented method of claim 1, further comprising processing the obtained at least one login information based on a processing request sent from the user.

7. A non-transitory, computer-readable medium storing one or more instructions executable by a computer system to perform operations comprising:
creating, at an information-processing device, a smart contract based on a predetermined smart contract template, wherein the smart contract comprises login information corresponding to a user, wherein the login information is determined based on a login information storage request sent from the user, and wherein the login information storage request comprises an identifier;
processing the identifier to obtain a private-public key pair;
obtaining a first address in a blockchain network through calculation based on a public key of the private-public key pair;
obtaining a storage address in the blockchain network based on a specified transaction event initiated at the first address;
storing the created smart contract at the storage address;
receiving a login information query request from the user, wherein the login information query request comprises the identifier;
retrieving at least one smart contract from the blockchain network based on the identifier, and determining a smart contract corresponding to the user from the at least one retrieved smart contract; and
executing the smart contract corresponding to the user to obtain at least one login information, and sending the obtained at least one login information to the user.

8. The non-transitory, computer-readable medium of claim 7, wherein the login information storage request comprises the login information, and wherein creating the smart contract based on the predetermined smart contract template comprises:
encrypting the login information by using the public key in the private-public key pair; and
creating, based on the predetermined smart contract template, the smart contract, wherein the smart contract comprises the encrypted login information.

9. The non-transitory, computer-readable medium of claim 7, wherein retrieving the at least one smart contract from the blockchain network comprises:
obtaining a first retrieval address through calculation based on the public key in the private-public key pair;
determining, based on the first address, at least one second retrieval address, wherein each of the at least one second retrieval addresses performs a transaction with the first address; and
retrieving the at least one smart contract from one of the at least one second retrieval addresses.

10. The non-transitory, computer-readable medium of claim 7, wherein determining the smart contract corresponding to the user from the retrieved at least one smart contracts comprises:
if one smart contract is retrieved from the blockchain network, that smart contract is determined as the smart contract corresponding to the user; and
if more than one smart contracts are retrieved from the blockchain network, a retrieved smart contract that satisfies a specified condition is determined as the smart contract corresponding to the user.

11. The non-transitory, computer-readable medium of claim 7, wherein the login information contained in the smart contract is encrypted, and wherein executing the smart contract to obtain the at least one login information comprises:
executing the smart contract to obtain encrypted login information;
decrypting the encrypted login information by using a private key of the private-public key pair to obtain decrypted login information; and
feeding back the decrypted login information to the user, wherein the decrypted login information can be confirmed by the user.

12. The non-transitory, computer-readable medium of claim 7, wherein the operations further comprise processing the obtained at least one login information based on a processing request sent from the user.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
creating, at an information-processing device, a smart contract based on a predetermined smart contract template, wherein the smart contract comprises login information corresponding to a user, wherein the login information is determined based on a login information storage request sent from the user, and wherein the login information storage request comprises an identifier;
processing the identifier to obtain a private-public key pair;
obtaining a first address in a blockchain network through calculation based on a public key of the private-public key pair;
obtaining a storage address in the blockchain network based on a specified transaction event initiated at the first address;

storing the created smart contract at the storage address;

receiving a login information query request from the user, wherein the login information query request comprises the identifier;

retrieving at least one smart contract from the blockchain network based on the identifier, and determining a smart contract corresponding to the user from the at least one retrieved smart contract; and executing the smart contract corresponding to the user to obtain at least one login information, and sending the obtained at least one login information to the user.

14. The computer-implemented system of claim 13, wherein the login information storage request comprises the login information, and wherein creating the smart contract based on the predetermined smart contract template comprises:

encrypting the login information by using the public key in the private-public key pair; and creating, based on the predetermined smart contract template, the smart contract, wherein the smart contract comprises the encrypted login information.

15. The computer-implemented system of claim 13, wherein retrieving the at least one smart contract from the blockchain network comprises:

obtaining a first retrieval address through calculation based on the public key in the private-public key pair;

determining, based on the first address, at least one second retrieval address, wherein each of the at least one second retrieval addresses performs a transaction with the first address; and retrieving the at least one smart contract from one of the at least one second retrieval addresses.

16. The computer-implemented system of claim 13, wherein determining the smart contract corresponding to the user from the retrieved at least one smart contracts comprises:

if one smart contract is retrieved from the blockchain network, that smart contract is determined as the smart contract corresponding to the user; and if more than one smart contracts are retrieved from the blockchain network, a retrieved smart contract that satisfies a specified condition is determined as the smart contract corresponding to the user.

17. The computer-implemented system of claim 13, wherein the login information contained in the smart contract is encrypted, and wherein executing the smart contract to obtain the at least one login information comprises:

executing the smart contract to obtain encrypted login information;

decrypting the encrypted login information by using a private key of the private-public key pair to obtain decrypted login information; and feeding back the decrypted login information to the user, wherein the decrypted login information can be confirmed by the user.

\* \* \* \* \*

UNITED STATES PATENT AND TRADEMARK OFFICE
CERTIFICATE OF CORRECTION

PATENT NO. : 10,698,997 B2
APPLICATION NO. : 16/034196
DATED : June 30, 2020
INVENTOR(S) : Hao Li Page 1 of 1

It is certified that error appears in the above-identified patent and that said Letters Patent is hereby corrected as shown below:

On the Title Page

Under Other Publications
Column 2, Line 2, delete "Technica" and insert -- Technical --, therefor.

Signed and Sealed this
Third Day of November, 2020

Andrei Iancu
*Director of the United States Patent and Trademark Office*